United States Patent [19]
Johnson et al.

[11] Patent Number: 5,837,045
[45] Date of Patent: Nov. 17, 1998

[54] COLORED PIGMENT AND AQUEOUS COMPOSITIONS CONTAINING SAME

[75] Inventors: Joseph E. Johnson, Nashua, N.H.; James A. Belmont, Acton, Mass.

[73] Assignee: Cabot Corporation, Boston, Mass.

[21] Appl. No.: 664,455

[22] Filed: Jun. 17, 1996

[51] Int. Cl.$^6$ ................................................ C09B 67/50
[52] U.S. Cl. ................. 106/31.85; 106/31.6; 106/31.86; 106/31.88; 106/413; 106/429; 106/445; 106/447; 106/448; 106/460; 106/465; 106/471; 106/487; 106/491; 106/493; 106/494; 106/495; 106/496; 106/497; 106/498; 106/499
[58] Field of Search ................................... 106/413, 429, 106/445, 447, 448, 460, 465, 471, 487, 491, 495, 493, 494, 496, 497, 498, 499, 31.6, 31.85, 31.86, 31.88

[56] References Cited

U.S. PATENT DOCUMENTS

| | | | |
|---|---|---|---|
| 3,423,391 | 1/1969 | Kindler et al. | 534/565 |
| 3,635,745 | 1/1972 | Rentel et al. | 106/493 |
| 5,098,475 | 3/1992 | Winnik et al. | 106/31.43 |
| 5,114,477 | 5/1992 | Mort et al. | 106/31.6 |
| 5,207,825 | 5/1993 | Schwarz, Jr. | 106/31.29 |
| 5,223,026 | 6/1993 | Schwarz, Jr. | 106/31.43 |
| 5,223,028 | 6/1993 | Aulick et al. | 106/31.43 |
| 5,242,489 | 9/1993 | Schwarz, Jr. | 106/31.49 |
| 5,254,158 | 10/1993 | Breton et al. | 106/31.58 |
| 5,258,064 | 11/1993 | Colt | 106/31.43 |
| 5,281,261 | 1/1994 | Lin et al. | 106/31.65 |
| 5,286,286 | 2/1994 | Winnik et al. | 106/31.15 |
| 5,389,131 | 2/1995 | Colt et al. | 106/31.43 |
| 5,395,434 | 3/1995 | Tochihara et al. | 106/31.43 |
| 5,413,630 | 5/1995 | Schwarz et al. | 106/31.48 |
| 5,571,311 | 11/1996 | Belmont et al. | 106/476 |

*Primary Examiner*—Mark L. Bell
*Assistant Examiner*—Scott L. Hertzog

[57] ABSTRACT

A surface-modified colored pigment is disclosed which includes a colored pigment having no primary amines and at least one attached hydrophilic organic group, wherein said organic group comprises a) at least one aromatic group, and b) at least one ionic group or ionizable group, or a mixture of an ionic group or an ionizable group. The colored pigment may be blue, brown, cyan, green, violet, magenta, red, orange, yellow, mixtures thereof and the like. The surface-modified colored pigment, due to the hydrophilic groups on its surface, is readily dispersed in a liquid vehicle without the addition of a surfactant or other dispersing aid or additive. The surface-modified color pigment may be used in a variety of aqueous systems including, but not limited to, coatings, paints, papers, adhesives, latexes, inks, toners, textiles and fibers. In addition, an aqueous composition is disclosed including water-based liquid vehicle and the surface-modified colored pigment described above. Also disclosed is an ink composition including a water-based liquid vehicle and the surface-modified colored pigment described above. Finally, a process is disclosed for preparing the surface-modified colored pigments having no primary amines and at least one attached hydrophilic organic group, wherein said organic group comprises a) at least one aromatic group, and b) at least one ionic or ionizable group, or a mixture of an ionic group or an ionizable group.

38 Claims, 5 Drawing Sheets

COLORED PIGMENT AND AQUEOUS COMPOSITIONS CONTAINING SAME

BACKGROUND OF THE INVENTION

1. Field of the Invention

This invention relates to a colored pigment and aqueous compositions containing the same and, more particularly, to colored ink compositions useful for imaging applications, such as ink jet inks.

2. Discussion of the Related Art

Aqueous systems are increasingly being used in many applications such as automotive and industrial coatings, paints, papers, inks, toners, adhesives, latexes, etc. as manufacturers face increased pressure to replace conventional solvent based systems. Such aqueous systems are known and generally contain a colorant, such as a dye or polymer/surfactant stabilized pigment, which is soluble in the aqueous vehicle, such as water or a mixture of water and a water-soluble or water-miscible organic solvent.

Although dye-based compositions are readily utilized, dyes have several disadvantages when used in, for example aqueous ink systems. For example, dyes, being water-soluble in a water/organic mixture, may dissolve and run when exposed to moisture or water. Dye images may further smear or rub off on contact with felt pen markers or upon being rubbed or touched by finger. Dyes also exhibit poor light stability when expose to visible or ultraviolet light.

Pigments are also known as colorants in aqueous compositions but have not received a wide degree of acceptance in aqueous systems, such as ink jet inks, because of problems associated with the performance and reliability of the composition, i.e., print properties, stability, latency, and the like. Examples of such pigments include carbon black, titanium dioxide white, cobalt blue ($CoO$—$Al_2O_3$), phthalocyanine blue, phthalocyanine green, and chrome yellow ($PbCrO_4$).

As a result, although known aqueous compositions are suitable for their intended purpose, a need remains for improved aqueous compositions, especially for use in the ink jet printers, which overcome the problems typically associated with current dye-based and pigment systems. In addition, a need exists for aqueous compositions having improved colloidal stability and lightfastness. It is also desirable to produce improved aqueous ink compositions which exhibit improved latency and recoverability in their respective printing systems while providing good print properties. A further need exists for improved aqueous ink compositions which generate print images having improved waterfastness.

SUMMARY OF THE INVENTION

The present invention relates to a surface-modified, colored pigment having at least one attached hydrophilic organic group. The colored pigment has no primary amines. A method of preparing the surface-modified, colored pigment having at least one attached hydrophilic organic group is also disclosed. The process comprises the step of reacting at least one diazonium salt with a colored pigment, preferably in a protic reaction medium.

The present invention is further directed to aqueous compositions comprising a surface-modified colored pigment having at least one attached hydrophilic organic group. Also disclosed in the present invention is an ink composition comprising a surface-modified, color pigment having at least one attached hydrophilic organic group.

The surface-modified color pigment of the present invention may be used in aqueous compositions containing conventional pigments. Such aqueous compositions include, for example, automotive and industrial coatings, paints, papers, toners, inks, adhesives, latexes, textiles and fibers. The surface-modified colored pigment may be tailored to provide compatibility with the particular aqueous system and provide easier, more complete dispersion, improved colloidal stability and greater color intensity and shades.

DETAILED DESCRIPTION OF THE INVENTION

Figure 1:
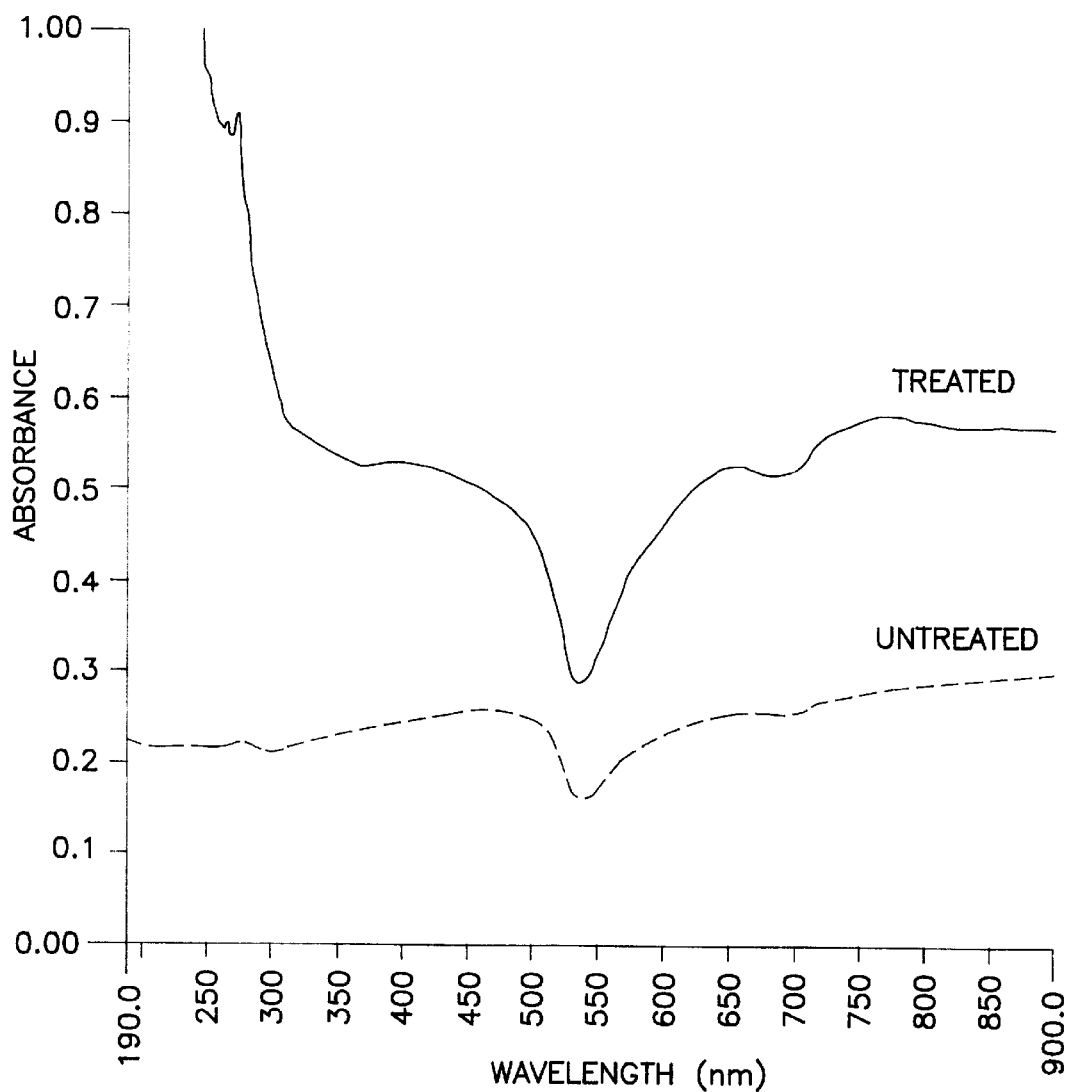
FIG. 1 is a graph of the wavelength (nm) on the x-axis versus absorbance on the y-axis for a surface-modified phthalocyanine blue (Pigment Blue 15) of the present invention and an untreated phthalocyanine blue (Pigment Blue 15).

The present invention relates to a surface-modified, colored pigment having at least one attached hydrophilic organic group. The colored pigment has no primary amines and, preferably, at least one aromatic ring in its repeating structure to promote the modification of the organic group to the surface of the pigment.

A wide range of conventional colored pigments may be used in the present invention provided that such pigments do not possess a primary amine. The colored pigment can be blue, brown, cyan, green, violet, magenta, red, yellow, as well as mixtures thereof. Suitable classes of colored pigments include, for example, anthraquinones, phthalocyanine blues, phthalocyanine greens, diazos, monoazos, pyranthrones, perylenes, heterocyclic yellows, quinacridones, and (thio)indigoids. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyranthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 117 and Pigment Yellow 138. Examples of other suitable colored pigments are described in the *Colour Index,* 3rd edition (The Society of Dyers and Colourists, 1982).

The hydrophilic organic group of the surface-modified colored pigment has at least one aromatic group, and at least one ionic group or ionizable group. A preferred set of organic groups which may be attached are organic groups substituted with an ionic or an ionizable group as a functional group. An ionizable group is one capable of forming an ionic group in the medium of use. The ionic group may be an anionic group or a cationic group and the ionizable group may form an anion or cation.

Ionizable functional groups forming anions include, for example, acidic groups or salts of acidic groups. The organic groups, therefore, include groups derived from organic acids. Preferably, when an organic group contains an ionizable group forming an anion, such an organic group has a) an aromatic group and b) at least one acidic group having a $pK_a$ of less than 11, or at least one salt of an acidic group having a $pK_a$ of less than 11, or a mixture of at least one acidic group having a $pK_a$ of less than 11 and at least one salt of an acidic group having a $pK_a$ of less than 11. The $pK_a$ of the acidic group refers to the $pK_a$ of the organic group as a whole, not just the acidic substituent. More preferably, the $pK_a$ is less than 10 and most preferably less than 9. Preferably, the aromatic group of the organic group is directly attached to the colored pigment. The aromatic group may be further substituted or unsubstituted, for example, with alkyl groups. More preferably, the organic group is a phenyl or a naphthyl group and the acidic group is a sulfonic acid group, a sulfinic acid group, a phosphonic acid group, or a carboxylic acid group. Most preferably, the organic group is a substituted or unsubstituted sulfophenyl group or a salt thereof; a substituted or unsubstituted carboxyphenyl; a substituted or unsubstituted (polysulfo)phenyl group or a salt thereof; a substituted or unsubstituted sulfonaphthyl group or a salt thereof; or a substituted or unsubstituted (polysulfo)naphthyl group or a salt thereof. Such groups include, for example, $C_6H_4SO_3^-M^+$, $C_6H_4CO_2^-M^+$, wherein $M^+$ is $Na^+$, $K^+$, or $Li^+$.

Amines represent examples of ionizable functional groups that form cationic groups. For example, amines may be protonated to form ammonium groups in acidic media. Preferably, an organic group having an amine substituent has a $pK_b$ of less than 5. Quaternary ammonium groups and quaternary phosphonium groups also represent examples of cationic groups. Preferably, the organic group contains an aromatic group such as a phenyl or a naphthyl group and a quaternary ammonium or a quaternary phosphonium group. The aromatic group is preferably directly attached to the colored pigment. Quaternized cyclic amines, and even quaternized aromatic amines, can also be used as the organic group. Thus, N-substituted pyridinium compounds, such as N-methyl-pyridyl, can be used in this regard.

Examples of organic groups include, but are not limited to, $C_6H_4N(CH_3)_3^+X^-$, $C_6H_4COCH_2N(CH_3)_3^+X^-$, $C_6H_4(NC_5H_5)^+X^-$, $(C_5H_4N)C_2H_5^+X^-$, $C_6H_4COCH_2(NC_5H_5)^+X^-$, $(C_5H_4N)CH_3^+X^-$, and $C_6H_4CH_2N(CH_3)_3^+X^-$, wherein $X^-$ is a monovalent ion.

The colored pigment of the present invention is subjected to a surface treatment which attaches the hydrophilic organic group to the aromatic moieties of the colored pigment. In general, the attachment reaction involves the use of a primary amine from the hydrophilic organic group. As a result, the absence of a primary amine from the colored pigment is essential to providing adequate surface modification and prevent decomposition of the colored pigment itself.

To prepare the surface-modified colored pigments of the present invention, it is desired that the reaction takes place in an environment sufficient to decompose the diazonium salt in the presence of the pigment. The surface-modified colored pigment, to the extent that a decomposed diazonium salt is present, may be prepared by the methods described in U.S. Pat. No. 5,554,739 to Belmont entitled, "Reaction of Carbon Materials with Diazonium Salts and Resultant Carbon Products," filed Dec. 15, 1994; U.S. Pat. No. 5,672,198 to Belmont entitled, "Reaction of Carbon Black with Diazonium Salts, Resultant Carbon Black Products and Their Uses," filed Dec. 15, 1994; and U.S. patent application No. 08/572,525 to Belmont entitled, "Reaction of Carbon Black with Diazonium Salts, Resultant Carbon Black Products and Their Uses," filed Dec. 14, 1995, the disclosures of which are fully incorporated herein by reference. Although such methods are primarily directed to carbon materials and carbon black, such described methods are useful to prepare the colored pigment of the present invention, whether it be a black or colored pigment. It is also recognized by those skilled in the art that other methods of preparation which would yield the required ionic stabilization are also suitable.

Preferably, the process is carried out in a protic medium, such as water, at a pH less than 7, more preferably at a pH of about 2. In addition, it is preferred that the reaction temperature is between about $-10°$ C. and about $100°$ C., more preferred between $40°$ C. and about $70°$ C., and especially preferred at $70°$ C.

The surface-modified color pigment of the present invention may be used in aqueous compositions containing conventional pigments. The following relating to ink compositions is similarly applicable to other aqueous systems including, for example, coatings, papers, paints, inks, toners, adhesives, latexes, textiles and fibers.

Ink compositions of the present invention comprise a surface-modified colored pigment having at least one attached hydrophilic organic group. The ink compositions are suitable for use in imaging applications, such as ink jet inks. Preferably, the ink compositions of the present invention further exhibit improved latency and the images generated therefrom exhibit improved waterfastness.

The surface-modified colored pigment of the present invention is present in the ink compositions in an amount effective to provide the desired image quality, e.g., optical density, without detrimentally affecting the performance of the ink. Typically, the surface-modified colored pigment will be present in an amount ranging from about 1% to about 20%, preferably from about 2% to about 10%, based on the weight of the ink composition. In addition, if the surface-modified colored pigment should be treated with the desired modifying agent in an amount sufficient to provide the desired utility in the end product application while maintaining the colloidal stability of the pigment in the ink composition.

The surface-modified colored pigment is typically as small as possible to enable a stable colloidal suspension of the pigment in the liquid vehicle and to prevent clogging of the ink channels and nozzles when used in the desired printing application. For example, a preferred average aggregate diameter of the surface-modified colored pigment for use in a thermal ink jet printer are generally below 1.0 micron, preferably in a range from about 0.005 micron to about 0.3 micron.

The ink compositions of the present inventions may be prepared utilizing conventional techniques known to those skilled in the art, such as combining or mixing the desired component in a suitable medium. Typically, the ink compositions are aqueous systems and, as such, include a significant amount of water, preferably deionized or distilled water. For example, the amount of water or similar medium is generally present in an amount ranging from about 50% to about 95%, preferably from about 60% to 80%, based on the weight of the ink composition.

The ink compositions of the present invention may be buffered to the desired pH by the addition of a suitable base, such as sodium hydroxide, ammonium hydroxide, triethylamine, dimethylethanolamine and the like, or a suitable acid, such as mineral acids, hydrochloric acid, sulfuric acid and the like. In addition, a polymer which is soluble in the ink composition may be added to improve the waterfastness of the images generated from the ink compositions. By "soluble" is meant that the polymer will dissolve in the ink vehicle to form a one phase system. These polymers include, for example, polyvinyl alcohol, polyester, polyestermelamine, styrene-acrylic acid copolymers, styrene-maleic acid copolymers, styrene-maleic acid-alkyl acrylate copolymers, styrene-metacrylic acid copolymers, styrene-metacrylic acid-alkyl acrylate copolymers, styrene-maleic half ester copolymers, vinyl-napthalene-acrylic acid copolymers, vinyl napthalene-maleic acid copolymers and salts thereof. Additional polymers include polyvinylimidazole, derivatives of polyvinylimidazole, copolymers of vinylimidazole, copolymers of vinylimidazole derivatives, polyvinylpyridine, derivatives of polyvinylpyridine, copolymers of vinylpyridine, copolymers of vinylpyridine derivatives, polyethyleneimine, derivatives of polyethyleneime, and mixtures thereof, as described in U.S. patent application Ser. No. 08/628,202 to Bates et al., entitled "Ink Compositions and Method of Generating Images Produced Therefrom," the disclosure of which is fully incorporated herein by reference.

Suitable additives are also generally incorporated into the ink compositions to impart a number of desired properties while maintaining the stability of the compositions. For example, a surfactant or suitable polymer may be used to enhance the colloidal stability of the colored pigment in the ink composition. Other additives are well known in the art and include humectants, biocides, binders, drying accelerators, penetrants and the like. Examples of humectants include ethylene glycol, propylene glycol, diethylene glycols, glycerine, dipropylene glycols, polyethylene glycols, polypropylene glycols, alkane diols, amides, ethers, carboxylic acids, esters, alcohols, organosulfides, organosulfoxides, sulfones, alcohol derivatives, 2-pyrrolidone, ether derivatives, amino alcohols, and ketones. The amount of a particular additive will vary depending on a variety of factors but are generally present in an amount ranging between 0% and 10%, preferably between 0.1% and 5%, although the amount may be outside this range.

Printed images may be generated from the ink compositions of the present invention by incorporating such compositions into a suitable printing apparatus, and generating an image onto a substrate. Suitable ink jet printers include, for example, thermal printers, piezoelectric printers, continuous printers, valve printers and the like. Similarly, any suitable substrate can be employed including plain papers, bonded papers, coated papers, transparency materials, textile materials, plastics, polymeric films, inorganic substrates and the like.

As noted above, the surface-modified color pigment may be used in other aqueous systems including, but not limited to, coatings, paints, papers, adhesives, latexes, toners, textiles and fibers. For example, the aqueous systems may be prepared by combining or mixing the surface-modified color pigment with suitable waterborne resins, such as alkyds, acrylics, polyesters, silicates, urethanes, epoxies and the like.

Non-limiting illustrations of the present invention follow.

EXAMPLE 1

Preparation of a Surface-Modified Colored Pigment

Twenty grams (20 g) of phthalocyanine blue (Pigment Blue 15, Colour Index (CI) # 74,160, available from Phthalchem/Cychem Inc., Cincinnati, Ohio) was mixed with 4.0 grams of sulfanilic acid (available from Aceto Corporation, Lake Success, N.Y.). The mixture was added to a beaker in a 70° C. water bath. A solution consisting of 1.68 grams of sodium nitrite (available from Aldrich Chemical, Milwaukee, Wis.) dissolved in 74.32 grams of distilled water was added to the beaker with rapid mixing to form a pigmented slurry. Hydrochloric acid was added to the solution to adjust the pH of the slurry to 2. The slurry was rapidly mixed at 70° C. using magnetic stirrer for one hour and then dried in an oven at 70° C. The resulting material was a dry modified colored pigment having $C_6H_4SO_3^-Na^+$ groups. Six gram (6 g) samples of the surface-modified colored pigment were extracted using methanol in a Sohxlet extractor for 10 hours to remove any reaction by-products and redried.

The samples of the surface-modified colored pigment were chemically analyzed using spectrophometric and/or titration reaction, to determine the sulfur content resulting from the sulfonate addition reaction. Carbon, hydrogen and nitrogen were also determined by a combustion technique using a Fissions EA-1108 gas chromatograph instrument. In addition, the zeta potential at a pH of 6 of a 5 mg/ml concentration of the modified colored pigment in a 0.0010M NaCl aqueous medium was determined using a Brookhaven Zeta-Plus Instrument, Holtsville, N.Y. Zeta potential ($\zeta$) is the potential difference, measured in a liquid, between the shear plane and the bulk of the liquid beyond the limits of the electrical double layer at the surface of the colored pigment. In addition, the zeta potential will be dependent on the type of surface groups of the modified colored pigment, in addition to the amount and type of ions in an aqueous medium. In addition, an absorbance spectra of modified color pigment at a 0.010%, by weight, concentration in distilled water were taken using a Perkin-Elmer Visible Model Lambda 6 UV/Vis spectrophotometer.

For comparative purposes, the sulfur content, carbon content, hydrogen content, nitrogen content and zeta potential was also determined for the untreated Pigment Blue 15.

The sulfur content, nitrogen content and zeta potential of the modified color pigment and the untreated pigment was illustrated in Table 1. The absorbance spectra of the surface-modified colored pigment and the untreated pigment is represented in FIG. 1.

TABLE 1

| (g. Sulfanilic Acid/g Pigment) × 100%* | Sulfur Content (%)** | Carbon Content (%)*** | Hydrogen Content (%)□ | Nitrogen Content (%)† | Zeta Potential (mV) |
|---|---|---|---|---|---|
| 0 | 0.09 | 66.74 | 2.79 | 19.50 | +13.7 |
| 20 | 1.64 | 59.46 | 2.64 | 16.01 | −49.7 |

*Ratio of the amounts of initially added sulfanilic acid to pigment in percent
**Resultant sulfur content in weight percent
***Resultant carbon content in weight percent
□Resultant hydrogen content in weight percent
†Resultant nitrogen content in weight percent As shown in Table 1, the addition of the sulfanilic acid with nitrite under acidic conditions resulted in the attachment of hydrophilic, sulfur-containing groups to the pigment, as noted in the increase in sulfur content. The decrease in carbon, hydrogen and nitrogen further indicates that chemical modification of the pigment took place. The difference in the zeta potentials show that the surface groups of the pigments are different in charge and magnitude in similar aqueous mediums. In addition, the difference in the zeta potentials illustrate that the surface reaction/attachment is taking place at the surface of the colored pigment. Finally, the larger absolute value of the zeta potential indicates a more colloidal stable system, while the negative charge indicates that the anionic nature of the surface group, i.e. sulfonate, on the pigment surface.

The absorbance plots of FIG. 1 demonstrate that the pigments vary in degree of dispersibility or affinity for water. The increase in absorbance throughout the wavelength range indicates that the surface-modified colored pigment was more readily dispersed in water using, for example, mild stirring such as shaking by hand. The untreated pigment, on the other hand, was very difficult to disperse in water, and agglomerated, i.e. clumped, upon standing in a short period of time.

It is expected that other phthalocyanine pigments will also be suitable for surface modification, provided they have at least one available aromatic site.

EXAMPLE 2

Preparation of a Surface-Modified Colored Pigment

A surface-modified phthalocyanine blue pigment was prepared by repeating the procedure of Example 1 except that the amount of sulfanilic acid was varied at 0.60 and 2.0 grams and the amount of sodium nitrite was also varied at 0.25 and 0.84 grams, respectively.

The sulfur content and zeta potential of the modified color pigment and the untreated pigment is illustrated in Table 2.

TABLE 2

| (g. Sulfanilic Acid/g. Pigment) × 100% | Sulfur Content (%)** | Zeta Potential (mV) |
|---|---|---|
| 0 | 0.09 | +13.7 |
| 3 | 0.28 | −40.9 |
| 10 | 0.54 | −45.6 |
| 20 | 1.64 | −49.7 |

**Resultant sulfur content in weight percent

Table 2 illustrates that as the amount of sulfanilic acid added to the reaction increases, an increase in attached sulfur groups results, as evidenced by the increase in the detected amount of sulfur. This increase in attached sulfur is also represented by the decrease in zeta potential. The result is a modified color pigment which is more readily dispersible and colloidally stable in an aqueous medium. It is further understood that the amount of attached sulfur groups may be varied by varying the amount of the sulfanilic acid.

EXAMPLE 3

Preparation of a Surface-Modified Colored Pigment

A surface-modified phthalocyanine blue pigment was prepared by repeating the procedure of Example 1 except that the treatment was at 40° C., instead of 70 ° C. The sulfur content and zeta potential of the surface-modified color pigment and the untreated pigment is illustrated in Table 3.

TABLE 3

| (g. Sulfanilic Acid/g. Pigment) × 100% | Sulfur Content (%)** | Zeta Potential (mV) |
|---|---|---|
| 0 | 0.09 | +13.7 |
| 3 | 0.14 | NM¤ |
| 10 | 0.30 | NM¤ |
| 20 | 0.54 | −44.0 |

**Resultant sulfur content in weight percent
¤NM = Not Measured

Similar to Example 2, Table 3 illustrates that as the amount of sulfanilic acid added to the reaction increases, an increase in attached sulfur groups results, as well as an expected decrease in zeta potential. The result is a surface-modified color pigment which is more readily dispersible and colloidally stable in an aqueous medium.

EXAMPLE 4

Preparation of a Surface-Modified Colored Pigment

A surface-modified phthalocyanine blue pigment was prepared by repeating the procedure of Example 1 except that the hydrochloric acid was omitted. The sulfur content and zeta potential of the surface-modified color pigment and the untreated pigment is illustrated in Table 4.

TABLE 4

| (g. Sulfanilic Acid/g. Pigment) × 100% | Sulfur Content (%)** | Zeta Potential (mV) |
|---|---|---|
| 0 | 0.09 | +13.7 |
| 3 | 0.13 | NM¤ |
| 10 | 0.19 | NM¤ |
| 20 | 0.23 | −44.5 |

**Resultant sulfur content in weight percent
¤NM = Not Measured

Table 4 illustrates that sulfonate addition reaction may take place in an acidic media without adjusting the pH with an acid. The result is a surface-modified color pigment which is more readily dispersible and colloidally stable in an aqueous medium.

EXAMPLE 5

Preparation of a Surface-Modified Colored Pigment

Figure 2:
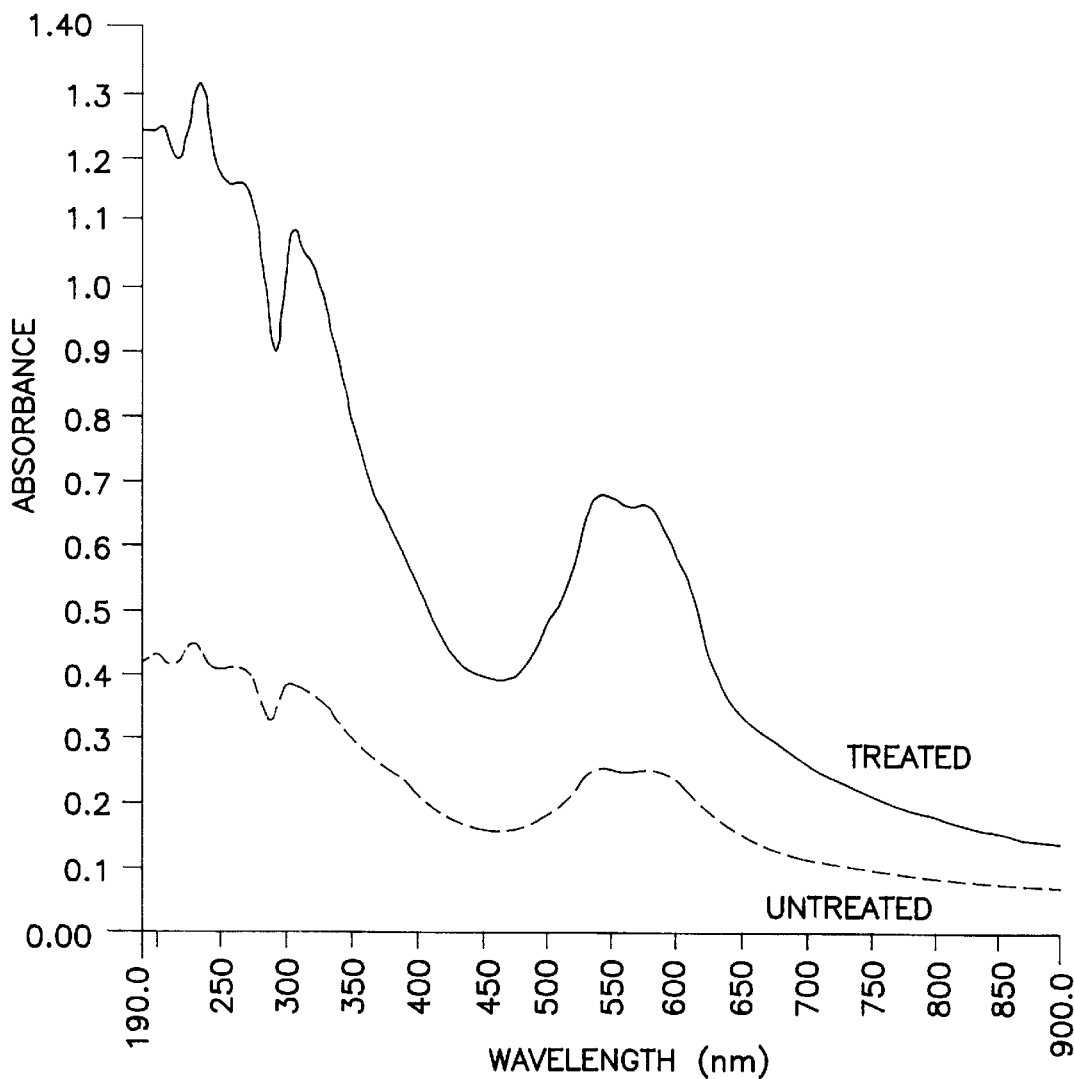
FIG. 2 is a graph of the wavelength (nm) on the x-axis versus absorbance on the y-axis for a surface-modified Paliogen Red Violet L5080 (Pigment Red 88) of the present invention and an untreated Paliogen Red Violet L5080 (Pigment Red 88).

A surface-modified indigoid pigment was prepared by repeating the procedure of Example 1 except that Paliogen Red Violet L5080 (Pigment Red 88, CI # 73312, available from BASF Corporation, Rensselaer, N.Y.) was used instead of the phthalocyanine blue. The sulfur content and zeta potential of the surface-modified color pigment and the untreated pigment was illustrated in Table 5. The absorbance spectra of the surface-modified colored pigment and the untreated pigment is represented in FIG. 2.

TABLE 5

| (g. Sulfanilic Acid/g. Pigment Blue 15) × 100% | Sulfur Content (%)** | Zeta Potential (mV) |
|---|---|---|
| 0 | 14.7 | −38.8 |
| 3 | 14.7 | NM¤ |
| 10 | 14.7 | NM¤ |
| 20 | 14.7 | −46.2 |

**Resultant sulfur content in weight percent
¤NM = Not Measured

Although Table 3 illustrates that there was no discernible difference in sulfur content between the modified color pigment and untreated pigment, the difference in zeta potential and absorbance spectra indicate the surface of the pigment was modified upon treatment. The result was a modified color pigment which was easily dispersed in distilled water upon vortexing.

EXAMPLE 6

Preparation of a Surface-Modified Colored Pigment

Figure 3:
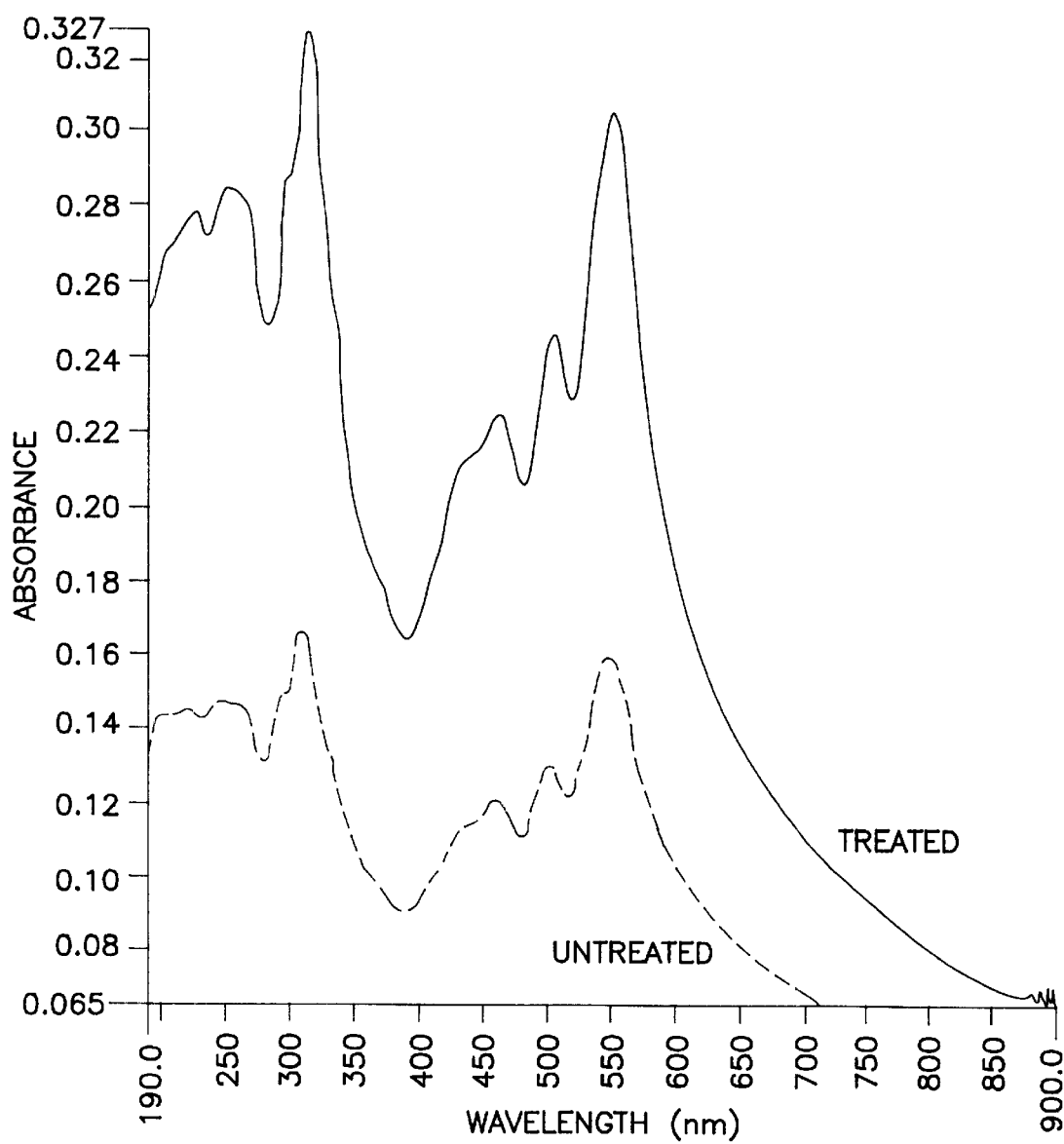
FIG. 3 is a graph of the wavelength (nm) on the x-axis versus absorbance on the y-axis for a surface-modified Hostaperm Orange GR (Pigment Orange 43) of the present invention and an untreated Hostaperm Orange GR (Pigment Orange 43).

A surface-modified anthraquinone pigment was prepared by repeating the procedure of Example 1 except that Hostaperm Orange GR (Pigment Orange 43, CI # 71105, available from Hoechst Celanese, Charlotte, N.C.) was used instead of the phthalocyanine blue. The sulfur content and zeta potential of the surface-modified color pigment and the untreated pigment is illustrated in Table 6. The absorbance spectra of the surface-modified colored pigment and the untreated pigment is represented in FIG. 3.

TABLE 6

| (g. Sulfanilic Acid/g. Pigment Red 88) × 100% | Sulfur Content (%) | Zeta Potential (mV) |
|---|---|---|
| 0 | 0.00 | −24.3 |
| 3 | 0.03 | NM¤ |
| 10 | 0.04 | NM¤ |
| 20 | 0.08 | −37.7 |

**Resultant sulfur content in weight percent
¤NM = Not Measured

Similar to the previous examples, the result was a surface-modified color pigment which was easily dispersed in distilled water upon vortexing.

EXAMPLE 7

Preparation of a Surface-Modified Colored Pigment

Figure 4:
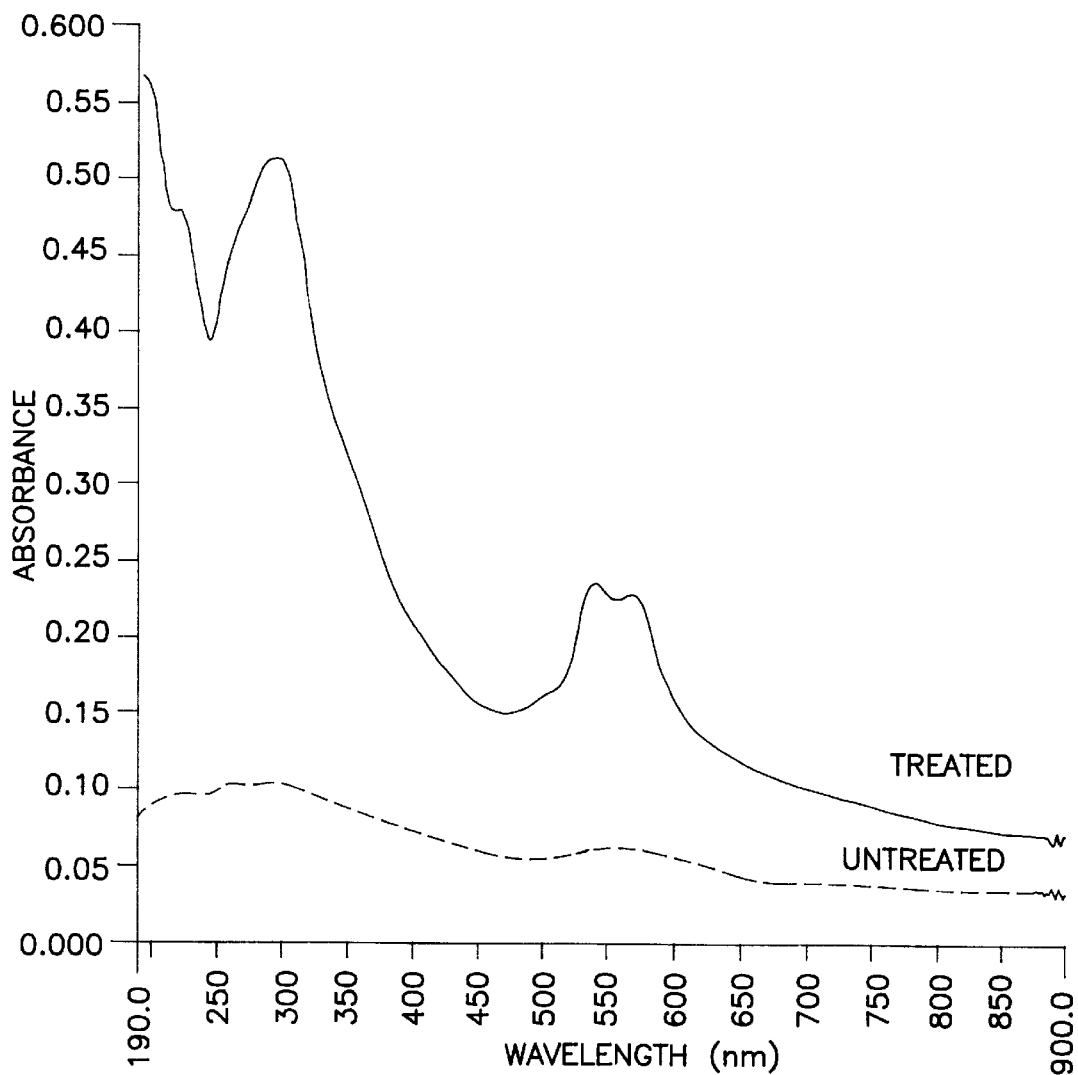
FIG. 4 is a graph of the wavelength (nm) on the x-axis versus absorbance on the y-axis for a surface-modified Hostaperm Pink E (Pigment Red 122) of the present invention and an untreated Hostaperm Pink E (Pigment Red 122).

A surface-modified quinonoid (also known as a quinacridone) pigment was prepared by repeating the procedure of Example 1 except that Hostaperm Pink E pigment (Pigment Red, 122, CI # 73915 available from Hoechst Celanese, Charlotte, N.C.) was used instead of the phthalocyanine blue. The sulfur content and zeta potential of the modified color pigment and the untreated pigment is illustrated in Table 7. The absorbance spectra of the surface-modified colored pigment and the untreated pigment, both at 0.0020% by weight concentration, is represented in FIG. 4.

TABLE 7

| (g. Sulfanilic Acid/g. Pigment) × 100% | Sulfur Content (%)** | Zeta Potential (mV) |
|---|---|---|
| 0 | 0.05 | −24.7 |
| 3 | 0.25 | NM¤ |
| 10 | 0.31 | NM¤ |
| 20 | 0.50 | −40.2 |

**Resultant sulfur content in weight percent
¤NM = Not Measured

Similar to the previous examples, the resulting surface-modified color pigment was easily dispersed in distilled water upon vortexing.

EXAMPLE 8

Preparation of a Surface-Modified Colored Pigment

Figure 5:
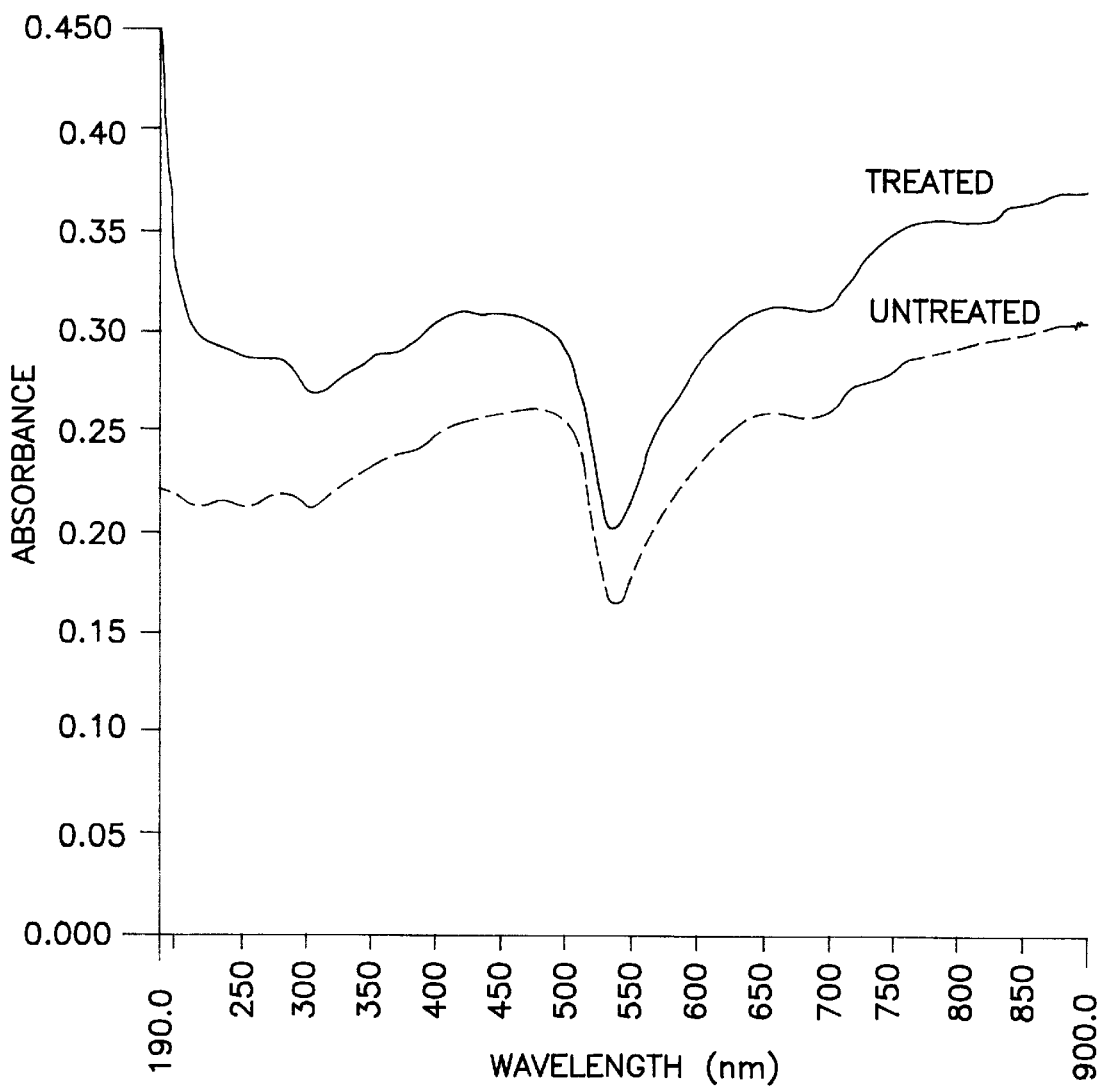
FIG. 5 is a graph of the wavelength (nm) on the x-axis versus absorbance on the y-axis for a surface-modified phthalocyanine blue (Pigment Blue 15) of the present invention and an untreated phthalocyanine blue (Pigment Blue 15).

A surface-modified phthalocyanine blue pigment was prepared by repeating the procedure of Example 1 except that N-(4-aminophenyl)pyridium chloride was used instead of the sulfanilic acid. The nitrogen content and zeta potential of the surface-modified color pigment and the untreated pigment is illustrated in Table 8. The absorbance spectra of the surface-modified colored pigment and the untreated pigment, is represented in FIG. 5.

TABLE 8

| (g. N-(4-aminophenyl)pyridium chloride/g Pigment) × 100%* | Carbon Content (%)*** | Hydrogen Content (%)□ | Nitrogen Content (%)† | Zeta Potential (mV) |
|---|---|---|---|---|
| 0 | 66.74 | 2.79 | 19.50 | +13.7 |
| 20 | 66.70 | 2.62 | 16.44 | +49 7 |

*Ratio of the amounts of initially added sulfanilic acid to pigment in percent
***Resultant carbon content in weight percent
□Resultant hydrogen content in weight percent
†Resultant nitrogen content in weight percent As shown in Table 8, the organic group added to the surface of the pigment contains carbon, hydrogen and nitrogen in approximately the same amounts as the pigment itself, thereby accounting for little change in the chemical composition. The dramatic difference in zeta potentials, however, reflects the addition of cationic groups to the surface of the pigment. The resulting surface-modified color pigment was easily dispersed in distilled water upon shaking.

EXAMPLE 9

Preparation of an Ink

The surface modified pigment of Example 1 was added to distilled water to form an aqueous dispersion at a 20% loading level, by weight, of pigment. The dispersion was filtered to below 5 microns and formulated into an ink jet ink having the following components, by weight: 7% surface-modified Pigment Blue 15, 63% distilled water, and 30% glycerol. The resultant ink has the following properties: pH=4.4.; surface tension=73 dynes/cm; and viscosity=3.73 cP.

Tristimulus color values, L*, a* and b*, were determined using a Hunter Lab Scan II Instrument, as indicated in Table 9. The values were obtained before and after washing the pigment for approximately 1 minute with distilled water and redrying.

TABLE 9

| Tristimulus Values | Pre-washed | Post-washed |
|---|---|---|
| L* | 28.42 | 27.83 |
| a* | −5.21 | −5.38 |
| b* | −21.88 | −22.98 |

The resulting ink generated an aesthetically pleasing blue print on Nashua Dual Purpose 20# uncoated paper using a Hewlett Packard DeskJet® 540 ink jet printer. The print was very waterfast as indicated by the similar tristimulus values, pre-washing and post-washing. The print had blue color as evidenced by the large negative b* value.

As noted above, the surface-modified organic pigment of the present invention may be useful in a wide variety of aqueous based applications and, in particular, ink compositions to provide the desired color and intensity. Unlike conventional pigments, the surface-modified color pigment is readily dispersed in the desired liquid vehicle requiring only low shear mixing or stirring. In addition, the surface-modified color pigment has a higher absolute zeta potential value and greater stability when compared to an untreated pigment.

The foregoing description of preferred embodiments of the invention has been presented for purposes of illustration and description. It is not intended to be exhaustive or to limit the invention to the precise form disclosed, and modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A surface-modified colored pigment comprising a colored pigment having no primary amines and at least one attached hydrophilic organic group, wherein said organic group comprises a) at least one aromatic group, and b) at least one ionic group or ionizable group, or a mixture of an ionic group or an ionizable group, wherein said aromatic group is directly attached to the surface of the colored pigment.

2. The surface-modified colored pigment of claim 1, wherein said colored pigment is selected from the group consisting of: blue, brown, cyan, green, violet, magenta, red, orange, yellow and mixtures thereof.

3. The surface-modified colored pigment of claim 1, wherein said ionic or ionizable group is selected from the group consisting of: a carboxylic acid or salt thereof; a sulfonic acid or salt thereof; a sulfophenyl group or salt thereof; a p-sulfophenyl or salt thereof; a carboxyphenyl group or salt thereof; a quaternary ammonium salt; a sulfonamide or salt thereof; and derivatives and mixtures thereof.

4. The surface-modified colored pigment of claim 3, wherein said sulfonic acid has a formula of $C_6H_4SO_3H$.

5. The surface-modified colored pigment of claim 3, wherein said organic group is selected from the group consisting of: $C_6H_4SO_3^-M^+$, $C_6H_4CO_2^-M^+$, $C_6H_4N(CH_3)_3^+X^-$, $C_6H_4COCH_2N(CH_3)_3^+X^-$, and $C_6H_4(NC_5H_5)^+X^-$, wherein $M^+$ is $Na^+$, $K^+$, or $Li^+$ and $X^-$ is a monovalent anion.

6. The surface-modified colored pigment of claim 1, wherein said organic group is attached to the surface of said pigment in an amount sufficient to improve the dispersibility of said surface-modified colored pigment in an aqueous medium.

7. An aqueous composition comprising a water-based liquid vehicle and a surface-modified colored pigment having no primary amines and at least one attached hydrophilic organic group, wherein said organic group comprises a) at least one aromatic group, and b) at least one ionic group or ionizable group, or mixture of an ionic group or an ionizable group, wherein said aromatic group is directly attached to the surface of the colored pigment.

8. The aqueous composition of claim 7, wherein said liquid vehicle comprises a resin selected from the group consisting of alkyd, acrylic, polyester, polyether, silicate, urethane, epoxy, formaldehyde, vinyl and mixtures thereof.

9. The aqueous composition of claim 7, wherein said colored pigment is selected from the group consisting of: blue, brown, cyan, green, violet, magenta, red, orange, yellow and mixtures thereof.

10. The aqueous composition of claim 7, wherein said ionic or ionizable group is selected from the group consisting of: a carboxylic acid or salt thereof; a sulfonic acid or salt thereof; a sulfophenyl group or salt thereof; a p-sulfophenyl or salt thereof; a carboxyphenyl group or salt thereof; a quaternary ammonium salt; a sulfonamide or salt thereof; and derivatives and mixtures thereof.

11. The aqueous composition of claim 10, wherein said sulfonic acid has a formula of $C_6H_4SO_3H$.

12. The aqueous composition of claim 7, wherein said organic group is selected from the group consisting of: $C_6H_4SO_3^-M^+$, $C_6H_4CO_2^-M^+$, $C_6H_4N(CH_3)_3^+X^-$, $C_6H_4COCH_2N(CH_3)_3^+X^-$, and $C_6H_4(NC_5H_5)^+X^-$, wherein $M^+$ is $Na^+$, $K^+$, or $Li^+$ and $X^-$ is a monovalent anion.

13. The aqueous composition of claim 7, wherein said organic group is attached to the surface of said pigment in an amount sufficient to improve the dispersibility of said surface-modified colored pigment in said liquid vehicle.

14. The aqueous composition of claim 7, wherein said composition further comprises at least one additive selected from the group consisting of surfactants, coalescing solvents, defoamers, antiskinning agents, drying agents, wetting agents, thickening agents, rheology control agents, biocides and corrosion inhibitors.

15. The aqueous composition of claim 7, wherein said composition is a paint, liquid ink, liquid toner, latex dispersion, or a coloring dispersion for paper, textile, or fiber.

16. The aqueous composition of claim 7, wherein said composition is a coating.

17. An ink composition comprising a water-based liquid vehicle and a surface-modified colored pigment having no primary amines and at least one attached hydrophilic organic group, wherein said organic group comprises a) at least one aromatic group, and b) at least one ionic group or ionizable group, or a mixture of an ionic group or an ionizable group, wherein said aromatic group is directly attached to the surface of the colored pigment.

18. The ink composition of claim 17, wherein said liquid vehicle is water.

19. The ink composition of claim 17, wherein said colored pigment is selected from the group consisting of: blue, brown, cyan, green, violet, magenta, red, orange, yellow and mixtures thereof.

20. The ink composition of claim 17, wherein said ionic or ionizable group is selected from the group consisting of:

a carboxylic acid or salt thereof; a sulfonic acid or salt thereof; a sulfophenyl group or salt thereof; a p-sulfophenyl or salt thereof; a carboxyphenyl group or salt thereof; a quaternary ammonium salt; a sulfonamide or salt thereof; and derivatives and mixtures thereof.

21. The ink composition of claim 20, wherein said sulfonic acid has a formula of $C_6H_4SO_3H$.

22. The ink composition of claim 17, wherein said organic group is selected from the group consisting of: $C_6H_4SO_3^- M^+$, $C_6H_4CO_2^- M^+$, $C_6H_4N(CH_3)_3^+ X^-$, $C_6H_4COCH_2N(CH_3)_3^+ X^-$, and $C_6H_4(NC_5H_5)^+ X^-$, wherein $M^+$ is $Na^+$, $K^+$, or $Li^+$ and $X^-$ is a monovalent anion.

23. The ink composition of claim 17, wherein said organic group is attached to the surface of said pigment in an amount sufficient to improve the dispersibility of said surface-modified colored pigment in said liquid vehicle.

24. The ink composition of claim 17, wherein said composition further comprises an additive selected from the group consisting of: binders, biocides, buffers, drying accelerators, humectants, penetrants, polymers and surfactants.

25. The ink composition of claim 24, wherein said humectant is selected from the group consisting of: glycols, glycerol, polyols and derivatives and mixtures thereof.

26. The ink composition of claim 17, wherein said composition further comprises a polymer selected from the group consisting of: polyvinyl alcohol, polyester, polyestermelamine, styrene-acrylic acid copolymers, styrene-maleic acid copolymers, styrene-maleic acid-alkyl acrylate copolymers, styrene-metacrylic acid copolymers, styrene-metacrylic acid-alkyl acrylate copolymers, styrene-maleic half ester copolymers, vinyl napthalene-acrylic acid copolymers, vinyl napthalene-maleic acid copolymers and salts and mixtures thereof.

27. The ink composition of claim 17, wherein said composition further comprises a polymer selected from the group consisting of: polyvinylimidazole, derivatives of polyvinylimidazole, copolymers of vinylimidazole, copolymers of vinylimidazole derivatives, polyvinylpyridine, derivatives of polyvinylpyridine, copolymers of vinylpyridine, copolymers of vinylpyridine derivatives, polyethyleneimine, derivatives of polyethyleneime, and mixtures thereof.

28. The ink composition of claim 17, wherein said ink composition is an ink jet ink.

29. A process for preparing a surface-modified colored pigment having at least one attached hydrophilic organic group, wherein said pigment has no primary amine and at least one carbon double bond and said hydrophilic group comprises at least one aromatic group which is directly attached to the surface of the colored pigment comprising the steps of:

combining at least one diazonium salt with said colored pigment in an environment sufficient to decompose the diazonium salt, and attaching said aromatic group directly to the surface of the colored pigment.

30. The process of claim 29, wherein said diazonium salt is generated by reacting a primary amine and a nitrous acid.

31. The process of claim 29, wherein said diazonium salt is generated by reacting a primary amine, a nitrite and an acid.

32. The process of claim 29, wherein said reacting step is carried out in an protic medium.

33. The process of claim 32, wherein said protic medium is water.

34. The process of claim 33, wherein said water has a pH less than 7.

35. The process of claim 34, wherein said water has a pH at approximately 2.

36. The process of claim 29, wherein said reacting is carried out at a temperature between about −10° C. and about 100° C.

37. The process of claim 36, wherein said reacting is carried out at a temperature between about 40° C. and about 70° C.

38. The process of claim 37, wherein said reacting is carried out at a temperature at about 70° C.

* * * * *